(12) United States Patent
Van Der Velde et al.

(10) Patent No.: US 12,309,618 B2
(45) Date of Patent: May 20, 2025

(54) TELECOMMUNICATION SYSTEMS

(71) Applicant: SAMSUNG ELECTRONICS CO., LTD., Suwon-si (KR)

(72) Inventors: Himke Van Der Velde, Staines (GB); Seungri Jin, Suwon-si (KR); Jaehyuk Jang, Suwon-si (KR); Sangbum Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 404 days.

(21) Appl. No.: 17/757,209

(22) PCT Filed: Dec. 14, 2020

(86) PCT No.: PCT/KR2020/018231
§ 371 (c)(1),
(2) Date: Jun. 10, 2022

(87) PCT Pub. No.: WO2021/118320
PCT Pub. Date: Jun. 17, 2021

(65) Prior Publication Data
US 2023/0007506 A1    Jan. 5, 2023

(30) Foreign Application Priority Data

Dec. 12, 2019   (GB) .................................... 1918272
Feb. 14, 2020   (GB) .................................... 2002028
Dec. 10, 2020   (GB) .................................... 2019529

(51) Int. Cl.
*H04W 24/02*   (2009.01)
*H04W 24/10*   (2009.01)
(Continued)

(52) U.S. Cl.
CPC .......... *H04W 24/02* (2013.01); *H04W 24/10* (2013.01); *H04W 76/16* (2018.02); *H04W 88/06* (2013.01)

(58) Field of Classification Search
None
See application file for complete search history.

(56) References Cited

U.S. PATENT DOCUMENTS 10,728,943 B2   7/2020   Jang et al.
10,735,968 B2   8/2020   Jang et al.
(Continued)

FOREIGN PATENT DOCUMENTS

CN   107439034 A   12/2017
CN   107926001 A    4/2018
(Continued)

OTHER PUBLICATIONS

Office Action issued May 23, 2024, in connection with Chinese Patent Application No. 202080086032.1, 25 pages.
(Continued)

*Primary Examiner* — Saumit Shah

(57) ABSTRACT

The present disclosure relates to a communication method and system for converging a 5th-Generation (5G) communication system or networks beyond 5G communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

Disclosed is a method of a User Equipment, UE, providing overheating assistance to a telecommunication network, wherein the UE is arranged to provide the overheating
(Continued)

assistance in one of two modes, wherein: in a first mode the UE reports details related to a first set of assistance parameters; and in a second mode the UE reports details related to a second set of assistance parameters, wherein a setting of the first set of parameters depends on a setting of the second set of parameters.

8 Claims, 15 Drawing Sheets

(51) Int. Cl.
  *H04W 76/16* (2018.01)
  *H04W 88/06* (2009.01)

(56) References Cited

U.S. PATENT DOCUMENTS

| | | | |
|---|---|---|---|
| 2017/0181172 A1* | 6/2017 | Susitaival | H04W 72/0453 |
| 2019/0230550 A1* | 7/2019 | Yiu | H04W 24/10 |
| 2020/0128479 A1 | 4/2020 | Xu et al. | |
| 2020/0275526 A1 | 8/2020 | Sharma et al. | |
| 2021/0051592 A1 | 2/2021 | Wang et al. | |
| 2021/0092662 A1* | 3/2021 | Takahashi | H04W 72/541 |
| 2022/0338037 A1* | 10/2022 | Jiang | H04J 11/0023 |
| 2022/0346109 A1* | 10/2022 | Cheng | H04L 5/0035 |

FOREIGN PATENT DOCUMENTS

| | | | |
|---|---|---|---|
| KR | 20130126382 A | 11/2013 | |
| KR | 10-2019-0102278 A | 9/2019 | |
| WO | 2014078086 A1 | 5/2014 | |
| WO | 2015171255 A1 | 11/2015 | |
| WO | 2017183899 A2 | 10/2017 | |
| WO | 2018016853 A1 | 1/2018 | |
| WO | 2019068818 A1 | 4/2019 | |
| WO | 2019/095254 A1 | 5/2019 | |
| WO | 2021030422 A1 | 2/2021 | |
| WO | 2021040608 A1 | 3/2021 | |
| WO | 2021/258766 A1 | 12/2021 | |

OTHER PUBLICATIONS

Samsung, "Bandwidth for IDC reporting with NR", R2-1817726 (Part of R2-1814751), 3GPP TSG-RAN WG2 meeting #104, Spokane, USA, Nov. 12-16, 2018, 3 pages.

NTT Docomo, Inc, "Clarification on candidate NR frequencies for IDC in EN-DC", R2-1915832, 3GPP TSG-RAN2 Meeting #108, Reno, Nevada, United States, Nov. 18-22, 2019, 6 pages.

United Kingdom Intellectual Property Office, "Combined Search and Examination Report under Sections 17 & 18(3)" Issued May 5, 2021, in connection with United Kingdom Patent Application No. GB2019529.3, 7 pages.

International Search Report and Written Opinion of the International Searching Authority in connection with International Application No. PCT/KR2020/018231 issued Mar. 15, 2021, 6 pages.

Vivo, "Introduction of NR IDC solution", R2-1914688, 3GPP TSG RAN2 Meeting #108, Reno, USA, Nov. 18-22, 2019, 28 pages.

3GPP TS 38.331 V15.7.0 (Sep. 2019); Technical Specification; 3rd Generation Partnership Project; Technical Specification Group Radio Access Network; NR; Radio Resource Control (RRC) protocol specification (Release 15); 528 pages.

Reliance Jio et al., "CR of TS 36.331 for introducing NavIC in LTE-core part", R2-1916294, 3GPP TSG RAN2 Meeting #108, Reno, USA, Nov. 18-22, 2019, 11 pages.

Samsung, "On UE assistance information", R1-1912489, 3GPP TSG RAN WG1 Meeting #99, Reno, USA, Nov. 18-22, 2019, 4 pages.

Huawei et al., "Further considerations on overheating issue in EN-DC scenario". 3GPP TSG-RAN2 Meeting#106, R2-1907865, Reno, USA, May 13-17, 2019, 4 pages.

Huawei et al., "Overheating issue in (NG)EN-DC" R2-1916596, 3GPP TSG-RANWG2 Meeting#108, Reno, USA, Nov. 18-22, 2019, 4 pages.

Huawei et al., "Summary of email discussion [107bis#47][NR TEI16] Overheating reporting in (NG)EN-DC", 3GPP TSG-RAN2 Meeting#108, Nov. 18-22, 2019, R2-1915259, 9 pages.

CMCC (Email Rapporteur), "Email discussion report [99#33][LTE/eVILTE] US assistance information", 3GPP TSG-RAN WG2 #100, Nov. 27-Dec. 1, 2017, R2-1713234, 7 pages.

Supplementary European Search Report dated Dec. 13, 2022 in connection with European Patent Application No. 20 89 9248, 24 pages.

Office Action issued Oct. 16, 2024, in connection with Chinese Patent Application No. 202080086032.1, 16 pages.

Notice of Allowance issued Dec. 27, 2024, in connection with Chinese Patent Application No. 202080086032.1, 9 pages.

\* cited by examiner

FIG. 3A

```
IdleModeMobilityControlInfo ::=    SEQUENCE {
        freqPriorityListEUTRA           FreqPriorityListEUTRA              OPTIONAL,    -- Need ON
        -- Irrelevant parts omitted
        ...,
        [[ freqPriorityListExtEUTRA-r12     FreqPriorityListExtEUTRA-r12       OPTIONAL     -- Need ON
        ]],
        [[ freqPriorityListEUTRA-v1310      FreqPriorityListEUTRA-v1310        OPTIONAL     -- Need ON
           freqPriorityListExtEUTRA-v1310   FreqPriorityListExtEUTRA-v1310     OPTIONAL     -- Need ON
        ]]
{
FreqPriorityListEUTRA ::=            SEQUENCE (SIZE (1.. maxFreq) ) OF FreqPriorityEUTRA
FreqPriorityListExtEUTRA-r12 ::=     SEQUENCE (SIZE (1.. maxFreq) ) OF FreqPriorityEUTRA-r12
FreqPriorityListEUTRA-v1310 ::=      SEQUENCE (SIZE (1.. maxFreq) ) OF FreqPriorityEUTRA-v1310
FreqPriorityListExtEUTRA-v1310 ::=   SEQUENCE (SIZE (1.. maxFreq) ) OF FreqPriorityEUTRA-v1310
```

FIG. 3B

```
RF-ParametersMRDC ::=                        SEQUENCE {
    supportedBandCombinationList             BandCombinationList              OPTIONAL,
    appliedFreqBandListFilter                FreqBandList                     OPTIONAL,
    ...,
    [[  srs-SwitchingTimeRequested           ENUMERATED {true}                OPTIONAL,
        supportedBandCombinationList-v1540   BandCombinationList-v1540        OPTIONAL
    ]],
    [[  supportedBandCombinationList-v1550   BandCombinationList-v1550        OPTIONAL
    ]],
    [[  supportedBandCombinationList-v1560   BandCombinationList-v1560        OPTIONAL,
        supportedBandCombinationListNEDC-Only  BandCombinationList            OPTIONAL
    ]],
    [[  supportedBandCombinationList-v1570   BandCombinationList-v1570        OPTIONAL
    ]],
    [[  supportedBandCombinationList-v1580   BandCombinationList-v1580        OPTIONAL
    ]],
    [[  supportedBandCombinationListNEDC-Only-v15xy   SEQUENCE {
            supportedBandCombinationListNEDC-Only1   BandCombinationList-v1540  OPTIONAL,
            supportedBandCombinationListNEDC-Only2   BandCombinationList-v1560  OPTIONAL,
            supportedBandCombinationListNEDC-Only3   BandCombinationList-v1580  OPTIONAL,
        }                                                                       OPTIONAL,
    ]]
}
```

FIG. 4A

```
IdleModeMobilityControlInfo ::=    SEQUENCE {
    freqPriorityListEUTRA          FreqPriorityListEUTRA          OPTIONAL,    -- Need ON
    -- Irrelevant parts omitted
    ...,
    [[ freqPriorityListExtEUTRA-r12    FreqPriorityListExtEUTRA-r12    OPTIONAL    -- Need ON
    ]],
    [[ freqPriorityListEUTRA-v1310     FreqPriorityListEUTRA-v1310     OPTIONAL    -- Need ON
    ]]
}
FreqPriorityListEUTRA ::=           SEQUENCE (SIZE (1..maxFreq) ) OF FreqPriorityEUTRA
FreqPriorityListExtEUTRA-r12 ::=    SEQUENCE (SIZE (1..maxFreq) ) OF FreqPriorityEUTRA-r12
FreqPriorityListCombEUTRA-v1310 ::= SEQUENCE (SIZE (1..maxFreq2) ) OF FreqPriorityEUTRA-v1310 maxFreq          INTEGER ::= 8     -- Maximum number of carrier frequencies
maxFreq2         INTEGER ::= 16    -- Maximum number of carrier frequencies
-- i.e., maxFreq2 being double to support same number of entries
```

FIG. 4B

```
RF-ParametersMRDC ::=                     SEQUENCE {
    supportedBandCombinationList          BandCombinationList             OPTIONAL,
    appliedFreqBandListFilter             FreqBandList                    OPTIONAL,
    ...,
    [[  srs-SwitchingTimeRequested        ENUMERATED {true}               OPTIONAL,
        supportedBandCombinationList-v1540   BandCombinationList-v1540    OPTIONAL
    ]],
    [[  supportedBandCombinationList-v1550   BandCombinationList-v1550    OPTIONAL
    ]],
    [[  supportedBandCombinationList-v1560   BandCombinationList-v1560    OPTIONAL,
        supportedBandCombinationListNEDC-Only  BandCombinationList       OPTIONAL
    ]],
    [[  supportedBandCombinationList-v1570   BandCombinationList-v1570    OPTIONAL
    ]],
    [[  supportedBandCombinationList-v1580   BandCombinationList-v1580    OPTIONAL
    ]],
-- i.e., assuming BandCombinationList can support the total number of BCs that UE may support
-- covering both the ones in the original field and the ones in the NEDConly field
}
```

FIG. 6

```
IDC-Config-r11 ::=                SEQUENCE {
    idc-Indication-r11               ENUMERATED { setup }      OPTIONAL,   -- Need OR
    autonomousDenialSubframes-r11    SEQUENCE {
            autonomousDenialSubframes-r11      ENUMERATED {n2, n5, n10, n15,
                                                           n20, n30, spare2, spare1 }
            autonomousDenialValidity-r11       ENUMERATED {
                                                   sf200, sf500, sf1000, sf2000
                                                   spare4, spare3, spare2, spare1 }
    }       OPTIONAL,         -- Need OR
    ...,

[[ idc-Indication-UL-CA-r11           ENUMERATED { sutup }   OPTIONAL   -- Cond idc-Ind
    ]],
    [[ idc-HardwareSharingIndicarion-r13  ENUMERATED { sutup }   OPTIONAL   -- Need OR
    ]],
    [[ idc-Indication-MRDC-r15            CHOICE {
            release                       NULL,
            setup                         CandidateServingFreqListNR-r15
        }       OPTIONAL    -- Cond idc-Ind
    ]],
    [[ idc-Indication-MRDC-v16xy          CHOICE {
            release                       NULL,
            setup                         CandidateServingFreqListExtNR-r16
        }       OPTIONAL    -- Cond idc-Ind
    ]]
}
candidateServingFreqListNR-r15 ::= SEQUENCE (SIZE (1 .. maxFreqIDC-r11)) OF ARFCN-ValueNR-r15
candidateServingFreqListExtNR-r16 ::= SEQUENCE (SIZE (1 .. maxFreqIDC-r16)) OF ARFCN-ValueNR-r16
```

FIG. 7

```
IDC-Config-r11 ::=                SEQUENCE {
    idc-Indication-r11            ENUMERATED { setup }      OPTIONAL,    -- Need OR
    autonomousDenialSubframes-r11  SEQUENCE {
        autonomousDenialSubframes-r11    ENUMERATED {n2, n5, n10, n15,
                                                    n20, n30, spare2, spare1 }
        autonomousDenialValidity-r11     ENUMERATED {
                                                    sf200, sf500, sf1000, sf2000
                                                    spare4, spare3, spare2, spare1 }
    }           OPTIONAL,      -- Need OR
    ...,
    [[ idc-Indication-UL-CA-r11          ENUMERATED { sutup }   OPTIONAL   -- Cond idc-Ind
    ]],
    [[ idc-HardwareSharingIndicarion-r13 ENUMERATED { sutup }   OPTIONAL   -- Need OR
    ]],
    [[ idc-Indication-MRDC-r15       CHOICE {
            release                  NULL,
            setup                    CandidateServingFreqListNR-r15
        }           OPTIONAL     -- Cond idc-Ind
    ]],
    [[ idc-Indication-MRDC-v16xy     CHOICE {
            release                  NULL,
            setup                    CandidateServingFreqListExtNR-r16
        }           OPTIONAL     -- Cond idc-Ind
    ]]
}
CandidateServingFreqListNR-r15 ::= SEQUENCE (SIZE (1 .. maxFreqIDC-r11)) OF ARFCN-ValueNR-r15
CandidateServingFreqListExtNR-r16 ::= SEQUENCE (SIZE (1 .. maxFreqIDC-r16)) OF ARFCN-ValueNR-r16
CandidateFreqInfoNR-r16 ::=       SEQUENCE {
    centerFreq-r15                ARFCN-ValueNR-r15,
    bandwidth                     INTEGER (0 .. maxBW-r16),
}
```

TELECOMMUNICATION SYSTEMS

CROSS-REFERENCE TO RELATED APPLICATIONS

This application is a 371 of International Application No. PCT/KR2020/018231, filed Dec. 14, 2020, which claims priority to United Kingdom Patent Application No. 1918272.4 filed Dec. 12, 2019, United Kingdom Patent Application No. 2002028.5 filed Feb. 14, 2020, and United Kingdom Patent Application No. 2019529.3 filed Dec. 10, 2020, the disclosures of which are herein incorporated by reference in their entirety.

BACKGROUND

1. Field

The disclosure concerns issues related to a User Equipment (UE) providing information to a Radio Access Network, RAN, to assist the network with setting the radio configuration. The assistance provided can relate to overheating in such a UE. In a further aspect, it also relates to improvements in and relating to In Device Coexistence (IDC). It relates to fifth generation (5G) or New Radio (NR) systems, and to networks beyond 5G and other systems and devices can benefit from embodiments of the disclosure.

2. Description of Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post LTE System'.

The 5G communication system is considered to be implemented in higher frequency millimeter wave (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid Frequency-Shift Keying (FSK) and Quadrature Amplitude Modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

Meanwhile, UEs are typically portable, battery-operated devices intended for use by users while carrying on their normal activities. Depending on the functions being performed by the UE, the internal temperature of the UE can rise to an undesirable level. The increase in temperature can depend on the number and/or types of activities being undertaken by the UE.

SUMMARY

In LTE system, the UE is able to report that the UE is overheating and request the network to reduce the number of Carrier Components (CC) and/or the data rate according to a lower UE category and in response, the network is able to adjust the radio configuration of the UE such that its power consumption may be reduced. Also, in LTE systems, the UE is able to report that it experiences In-device Coexistence (IDC) problems for a particular band or band combination.

5G systems differ in some respects from LTE systems. Consequently, the approach used in LTE is either not possible or not desirable.

An embodiment of the disclosure aims to address the aforementioned issues, in particular for UEs configured with EN-DC i.e. dual connectivity with LTE (EURA) used for the master cell group (MCG) and NR for the secondary cell group (SCG), and other issues not specifically mentioned here.

An another embodiment of the disclosure aims to address the aforementioned issues, both for UEs connected to LTE (e.g. mobility to NR or for EN-DC) or to NR, and other issues not specifically mentioned here.

According to the disclosure, there is improvements in and relating to addressing overheating in UE connected to at least one of LTE or NR.

BRIEF DESCRIPTION OF THE DRAWINGS

For a better understanding of the invention, and to show how embodiments of the same may be carried into effect, reference will now be made, by way of example only, to the accompanying diagrammatic drawings in which:

FIGS. 3a and 3b show an extension case of list entries for LTE and NR respectively;

FIGS. 4*a* and 4*b* show an extension case of configuration list entries for LTE and NR respectively according to an embodiment of the disclosure;

FIG. 6 shows details related to signalling allowing configuration of additional ARFCNs for IDC reporting according to an embodiment of the disclosure;

FIG. 7 shows details related to signalling allowing configuration of additional ARFCNs and BW for IDC reporting according to an embodiment of the disclosure.

Throughout the drawings, like reference numerals will be understood to refer to like parts, components, and structures.

DETAILED DESCRIPTION

Figure 1:
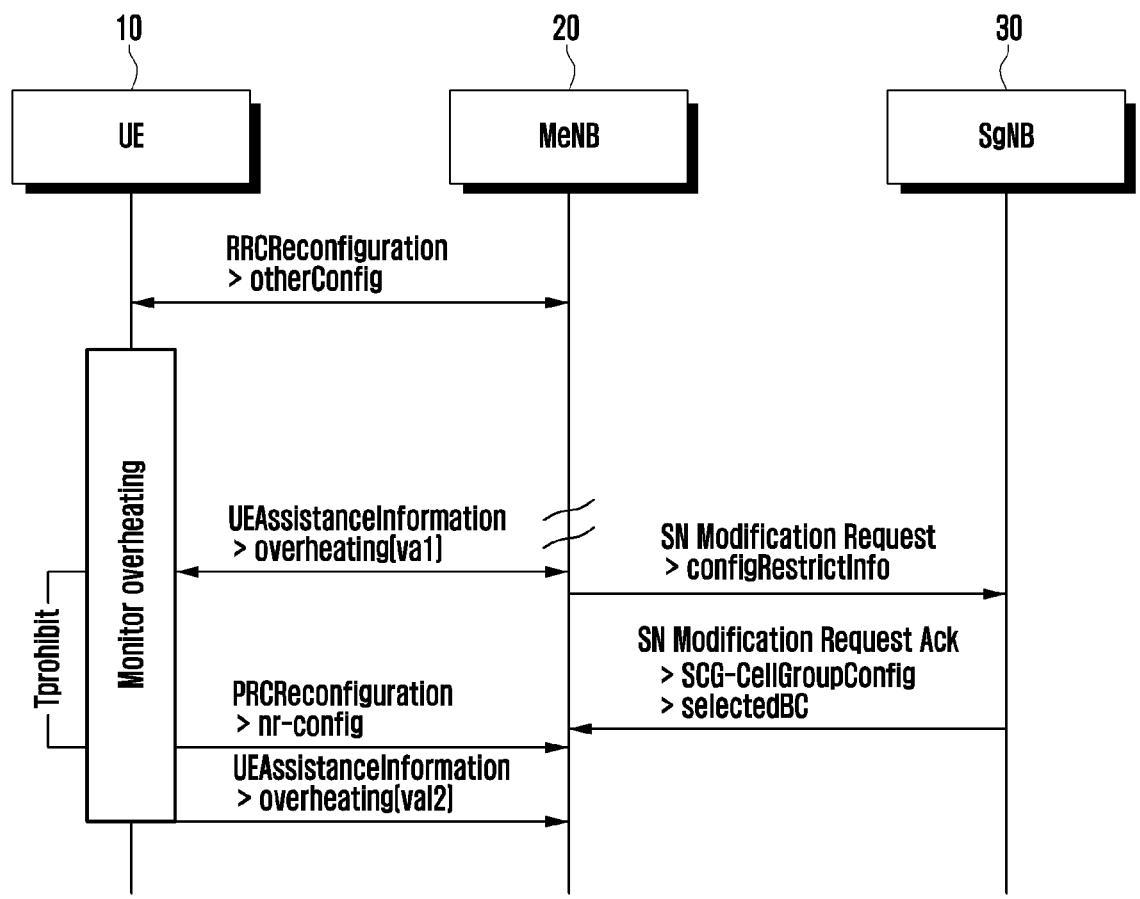
FIG. 1 shows signalling in connection with overheating information in a first embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, a term to identify an access node, a term to denote network entities, a term to denote messages, a term to denote an interface between network entities, and a term to denote a variety of types of identity information have been illustrated for convenience of description. Accordingly, the disclosure is not limited to the following terms, and other terms to denote targets having equivalent technical meanings may be used.

For convenience of description, in the disclosure, terms and names defined in long term evolution (LTE) of a 3rd generation partnership project (hereinafter referred to as "3GPP"), new radio (NR) standards are used. However, the disclosure is not restricted by the terms and names, and may be identically applied to systems complying with other standards.

First, terms used in this specification are defined.

In this specification, a radio bearer may include a data radio bearer (DRB) and a signaling radio bearer (SRB).

For example, a data radio bearer (DRB) provided in a radio interface between a terminal and a base station is a path through which the data of a user plane is forwarded. A signaling radio bearer (SRB) may be a path through which the data of a control plane, such a radio resource control (RRC) layer and non-access-stratum (NAS) control message, is forwarded.

In this specification, a wireless communication system supported in a network over which a plurality of communication systems interwork may support interworking between heterogeneous technologies frequency bands (multi-RAT interworking).

For example, the radio access technology may be a new radio access network (new RAN) supporting all of a 4G radio access technology (E-UTRA), a radio access technology evolved from 4G (evolved E-UTRA), and a 5G radio access technology (new radio (NR)).

In this specification, an inter system supporting same or different communication networks may be basically divided into a terminal, a radio access network, and a plurality of core networks (CNs).

In this specification, a terminal may be an integrated terminal supporting all of a 4G radio access technology (E-UTRA), a radio access technology evolved from 4G (evolved E-UTRA), and a 5G radio access technology (new radio (NR)).

In this specification, a radio access network, a base station, and a network node may be used as the same meaning. A base station may include a 5G base station (or new radio base station or gNB) using the 5G radio access technology (new radio (NR)), a 4G base station (LTE-eNB) using the 4G radio access technology (E-UTRA), and a base station (eLTE eNB) using the radio access technology evolved from 4G (evolved E-UTRA). Furthermore, the base station (eLTE eNB) may support the 4G radio access technology and the 5G radio access technology at the same time.

According to this specification, a wireless communication system, in which a terminal can perform communication with at least one cell associated with a first base station and at least one cell associated with a second base station, may support dual connectivity between the first base station and the second base station supporting heterogeneous or homogeneous radio access technology.

For example, the dual connectivity disclosed in this specification may include a case where both the first and second base stations relates to dual connectivity which concerns a 4G system or a case where the first base station relates to a 4G system and the second base station supports an NR system (E-UTRA-NR dual connectivity, EN-DC). Furthermore, even though the wireless communication system being disclosed in this specification relates to an EN-DC system, the system need not be limited thereto and can also embrace a multi-radio dual connectivity (MR-DC) system.

In an EN-DC system disclosed in this specification, a main base station may be used as the same meaning as a master base station, a master node (MN), or a master eNB (MeNB). A sub-base station may be used as the same meaning as a secondary base station, a secondary node (SN), or a secondary gNB (SgNB).

In the EN-DC system disclosed in this specification, a terminal may be connected to one eNB that operates as a master base station and one en-gNB that operates as a secondary base station.

The eNB may be connected to an EPC through an S1 interface and may be connected to an en-gNB through an X2 interface, and the en-gNB may be connected to the EPC through the S1. The en-gNB may be connected to the EPC through an X2-U interface or an S1-U interface.

In a homogeneous or heterogeneous network supporting small cell evolution, there are various requirements related to mobility robustness, signaling load being increased due to frequent handovers, improvement of throughput per user, system capacity, and the like.

The dual connectivity (DC) may imply control and data disconnection. For example, control signaling for mobility is provided through a macro cell at the same time as the time when a high-speed data connection is provided through a small cell.

Further, a disconnection between a downlink and an uplink and a connection between the downlink and the uplink are provided through other cells.

In the dual connectivity, the UE may be connected to one master node (MN) and one secondary node (SN).

In addition, a DC in which a carrier aggregation (CA) is configured means an operation mode of the UE in an RRC connected state, and it is composed of a master cell group and a secondary cell group.

Here, "cell group" indicates a group of serving cells related to a master base station or a secondary base station in the dual connectivity.

A "master cell group (MCG)" is a group of serving cells related to the master base station, and it includes a primary cell (PCell) and selectively one or more secondary cells (SCells) in the dual connectivity.

A "secondary cell group (SCG)" indicates a group of serving cells related to the secondary base station including a primary SCell (PSCell) and selectively one or more SCells.

Here, the "cell" as described hereinafter should be discriminated from a "cell" as a general area covered by the base station. That is, the cell indicates a combination of resources of a downlink and selectively an uplink.

An MCG bearer is a radio protocol located in the master base station only to use only resources provided by the master base station in the dual connectivity, and a SCG bearer is a radio protocol located in the secondary base station only to use resources provided by the secondary base station in the dual connectivity.

Further, a split bearer is a radio protocol located in both the master base station and the secondary base station to use all resources provided by the master base station and the secondary base station in the dual connectivity.

NR or 5G radio networks are operable over an extended range of frequencies compared to LTE networks. In particular, NR operates in two distinct ranges, known as Frequency Range 1 (FR1) and Frequency Range 2 (FR2). When reference is made in this application to "frequency range" in lower case, it is intended to refer to a range of frequencies over which a device may operate. References to FR1 or FR2 are to be interpreted in the light of their definitions in the applicable standards. Currently, FR1 is defined to span 450 Mhz-7.125 GHz and FR2 is defined to span 24.25 GHz-52.6 GHz.

Here, UE refers to mobile handsets, smartphones and the like, while RAN relates to different cases including networks using fifth generation (5G) or New Radio (NR) systems or beyond but other this is not limiting and other systems and devices can benefit from embodiments of the disclosure. Accordingly, this disclosure is not limited to the following terms, and other terms to denote targets having equivalent technical meanings may be used.

The disclosure concerns issues related to overheating in User Equipment (UE), such as mobile handsets, smartphones and the like. In a further aspect, it also relates to improvements in and relating to In Device Coexistence (IDC). It relates to fifth generation (5G) or New Radio (NR) systems, and to networks beyond 5G and other systems and devices can benefit from embodiments of the disclosure. Accordingly, this disclosure is not limited to the following terms, and other terms to denote targets having equivalent technical meanings may be used.

In LTE system, the UE is able to report that the UE is overheating and request the network to reduce the number of Carrier Components (CC) and/or the data rate according to a lower UE category and in response, the network is able to adjust the radio configuration of the UE such that its power consumption may be reduced.

5G systems differ in some respects from LTE systems. For instance, in 5G, there is no equivalent to "UE category". Furthermore, two distinct frequency ranges are used in NR, each typically supported by separate hardware. Moreover, some NR bands comprise a relatively large bandwidth and the network may configure the UE to operate in a particular portion of the concerned band. Consequently, the approach used in LTE is either not possible or not desirable. Embodiments of the disclosure aim to address the aforementioned issues, in particular for UEs configured with EN-DC i.e. dual connectivity with LTE (EURA) used for the master cell group (MCG) and NR for the secondary cell group (SCG), and other issues not specifically mentioned here.

In LTE systems, the UE is able to report that it experiences In-device Coexistence (IDC) problems for a particular band or band combination. 5G systems differ in some respect from LTE. In particular, some bands comprise a relatively large bandwidth and the network may configure the UE to operate in a particular portion of the concerned band. Consequently, using the LTE approach is not desirable. Embodiments of the disclosure aim to address the aforementioned issues, both for UEs connected to LTE (e.g. mobility to NR or for EN-DC) or to NR, and other issues not specifically mentioned here.

According to the disclosure there is provided an apparatus and method as set forth in the appended claims. Other features of the disclosure will be apparent from the dependent claims, and the description which follows.

According to a first aspect of the disclosure, there is provided a method of a User Equipment, UE, providing overheating assistance to a telecommunication network, wherein the UE is arranged to provide the overheating assistance in one of two modes, wherein: in a first mode the UE reports details related to a first set of assistance parameters; and in a second mode the UE reports details related to a second set of assistance parameters, wherein a setting of the first set of parameters depends on a setting of the second set of parameters.

In an embodiment, the first and second sets of assistance parameters are defined in different versions of a standards specification according to which the UE and the telecommunication network operate.

In an embodiment, the UE is in Dual Connectivity, DC, with the telecommunication network.

In an embodiment, the first set of assistance parameters concern both a master and a secondary connection while the second set of parameters specifically concerns the secondary connection.

In an embodiment, the first set of parameters comprises details related to a reduced UE category and a reduced maximum number of component carriers and the second set of parameters comprises details comprising a maximum aggregated bandwidth, BW, and MIMO layers per Frequency Range x, FRx.

In an embodiment, the UE utilises the second mode only when the telecommunication network requests it or indicates it is allowed.

In an embodiment, the network indication or request is indicated in a System Information Block, broadcast by the telecommunication network or by dedicated signalling to the UE; with the UE indicating support of the feature to inform the network it can use dedicated signalling.

In an embodiment, the UE changes from the second to the first mode upon explicit request from the network in the case where network control is done by dedicated signalling, or otherwise upon release of an NR secondary connection or upon determining that SIB indicates that the second mode is not allowed.

In an embodiment, if the UE changes from the first to second mode or vice-versa, the UE signals a previous value of assistance parameters, even if unchanged.

According to a second aspect of the disclosure, there is provided a UE operable to provide overheating assistance to a telecommunication network, wherein the UE is arranged to provide the overheating assistance in one of two modes, wherein: in a first mode the UE reports details related to a first set of assistance parameters; and in a second mode the UE reports details related to a second set of assistance parameters, wherein a setting of the first set of parameters depends on a setting of the second set of parameters.

According to a third aspect of the disclosure, there is provided a telecommunication network operable to signal to a UE to provide overheating assistance in one of two modes, wherein: in a first mode the UE reports details related to a first set of assistance parameters; and in a second mode the UE reports details related to a second set of assistance parameters, wherein a setting of the first set of parameters depends on a setting of the second set of parameters.

According to a fourth aspect of the disclosure, there is provided a system comprising the UE of the second aspect and the telecommunication network of the third aspect.

According to a fifth aspect of the disclosure, there is provided a method of a User Equipment, UE, providing UE assistance related to reporting an IDC issue concerning NR frequency bands to a telecommunication network, wherein the UE is configured to report IDC issues concerning one or more portions of the frequency band, wherein: the network indicates each portion of the band for which IDC reporting is requested, by an ARFCN indicating the centre frequency around which to report IDC: the BW of the portion can be either be signalled explicitly by the network, or determined by the UE.

In an embodiment, when determined by the UE, the BW of the portion can either be the BW that the UE is currently configured to use or according to a rule based on UE capabilities as signalled to the network.

In a further embodiment the UE can additionally indicate availability of early measurement results for NR frequencies by a new field in SetupComplete, ResumeComplete.

According to a sixth aspect of the disclosure, there is provided a method of a telecommunication network in which early measurement reporting is extended to cover NR frequencies; wherein indications are provided by which the network can control how a UE reports availability of, and provides, the concerned measurement results.

In an embodiment the telecommunication network indicates that it supports early measurement reporting for NR frequencies by means of a new field in a System Information Block, SIB2.

In an embodiment the UE additionally indicates availability of early measurement results for NR frequencies by a new field in SetupComplete, ResumeComplete.

In a seventh aspect of the disclosure there is provided a method, for use with a telecommunication network, relating to a list of which multiple occasions are signaled and for which, for each occasion, the same set of additional parameters is signaled for each entry of the list, and wherein a single list is used to signal the additional parameter.

In an embodiment, the size of the list can either be same as for each of the list occurrences, or be such that it include as many entries as the combination of all occurrences of the concerned list.

According to the disclosure there is provided an apparatus and method as set forth in the appended claims. Other features of the disclosure will be apparent from the dependent claims, and the description which follows.

Although a few preferred embodiments of the disclosure have been shown and described, it will be appreciated by those skilled in the art that various changes and modifications might be made without departing from the scope of the invention, as defined in the appended claims.

In a first embodiment, assistance is provided by the UE in one of two modes:

Mode 1 uses legacy fields available in defined signalling procedures;

Mode 2 also uses new fields, defined accordingly.

FIG. 1 shows a representation of the signals for overheating assistance reporting by a UE that is in EN-DC i.e. dual connected to an LTE (EURA) eNB acting as Master Node and controlling the master cell group (MCG) and NR gNB acting as Secondary Node and controlling the secondary cell group (SCG). The overheating assistance indicates the UE preferences regarding how it would like network to resolve the overheating.

FIG. 1 shows the signals exchanged between a UE 10, a Master eNB 20 and a Secondary gNB 30. In a first mode of operation, referred to as Mode 1, the information reported by UE in an overheating event is using only legacy fields i.e. reducedUE-category and reducedMaxCCs, the same as were defined for the case the UE was not configured for dual connectivity. Here the UE only sets legacy fields and can thus only indicate crude/rudimentary assistance information e.g. it can request network to reduce the total number of CCs without being able to indicate whether it prefers the network to reduce the number of carriers in MCG or SCG.

In a second mode of operation, referred to as Mode 2, the UE can report additional information in an overheating event i.e. using new fields indicating its preferences for an NR SCG. The overheating assistance for SCG comprises the max number of component carriers, CCs, for SCG as well as some new fields i.e. a) maximum aggregated BW and b) MIMO layers. Only for these new fields, that concern preferences for NR SCG, the UE can provide a value per Frequency Range x (FRx) i.e. for the max number of CCs the UE cannot provide a value per FRx. Here, in mode 2, the UE has the option to provide more fine assistance e.g. request reduction of aggregated BW or MIMO layers for NR serving cells in FR2. In such case the UE may or may not set legacy fields.

Figure 2A:
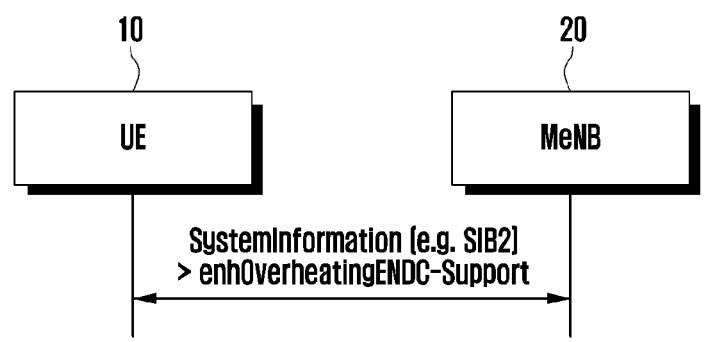
FIGS. 2a and 2b show signalling between a UE and the network in relation to network control of the overheating assistance reporting by the UE in different options according to a mode of operation according to an embodiment of the disclosure.
Figure 2B:
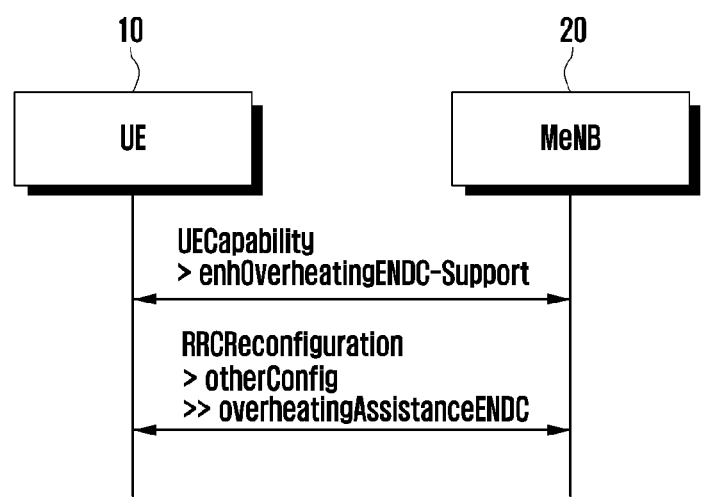

The value of the UE preferences indicated by legacy fields may depend on preferences indicated by the new fields for NR SCG. Hence, a UE supporting Mode 2 should only apply this mode when the network also supports the corresponding new fields. FIGS. 2a and 2b illustrate two options for the signalling between the UE 10 and MeNB 20 by which the network can indicate that the UE can use the new fields for NR SCG as used in Mode 2, above.

In option a), illustrated in FIG. 2a, a field on broadcast (e.g. using System Information Block 2, SIB2) indicating network supports mode 2 (or the updated, REL-16, fields). This can be achieved by use of e.g. extension field enhOverheatingENDC-Support in SIB2.

In option b), illustrated in FIG. 2b, a field in otherConfig may be used i.e. the network configures UE to provide UE assistance for NR SCG using the new fields i.e. to use mode 2. This can be achieved by e.g. extension field overheatingAssistanceENDC in OtherConfig.

As the network should only configure the UE to apply features that it supports, this option requires a corresponding UE capability e.g. by extension field enhOverheatingENDC-Support in LTE UE capabilities (1 bit indication, e.g. within IRAT-ParametersNR).

The mode (i.e. Mode 1 or Mode 2) to be used by UE 10 may need to be changed at least upon Setup/release of E-UTRAN New Radio-Dual Connectivity (EN-DC), amongst other events. Another such event is a change to/from a node supporting mode 2.

The table below, TABLE 1, illustrates different scenarios and the network options available to indicate the configuration options available.

The three scenarios are setup/release of EN Dual Connectivity, mobility to an enhanced node and mobility to a legacy node.

The network has two options with regards to signalling the configuration: broadcast or dedicated signalling (see columns a) and b) below).

TABLE 1

| Scenario | Network configuration option | |
|---|---|---|
| | a) Field on Broadcast indicating network support | b) Dedicated signaling of whether to use NR SCG fields/ mode 2 (otherConfig) |
| Setup/ release EN-DC | UE applies mode 2 if: 1) in EN-DC and 2) network indicates support | Network configures: 1) mode 2 only when UE is in EN-DC (e.g. upon EN-DC setup) 2) mode 1 whenever UE is not in EN-DC (e.g. upon EN-DC release) |
| Mobility to enhanced node | No additional UE actions required | Network may configure UE to apply mode 2 (by signaling extension) |
| Mobility to legacy node | No additional UE actions required | If UE is configured with mode 2, network applies full configuration to revert back to mode 2 |

Note that with option b), the network uses explicit signalling to control the UE i.e it configures mode 1 upon release of EN-DC; configures mode 2 upon setup of EN-DC; and applies fullConfig to revert back to mode 1 upon change to legacy node. It should be noted that rather than configuring the mode to use, the network may actually indicate whether to report NR SCG overheating assistance. i.e. when configuring UE to do so, this corresponds to mode 2 operation, and when configuring the UE to not report NR SCG overheating assistance (i.e. to releasing the NR SCG reporting), this corresponds to mode 1 operation.

With option a), the UE autonomously decides which mode to use. i.e. the corresponding UE actions for Option a) are: the UE reverts to mode 1 upon acquiring SIBx indicating non-support; or upon EN-DC release. The UE switches to mode 2 upon: acquiring SIBx indicating network support (field enhOverheatingENDC-Support) while in EN-DC; and EN-DC setup while SIM indicates network support (field enhOverheatingENDC-Support).

The UE options are for Option b): the UE reverts to mode 1 upon receiving otherConfig indicating mode 1/release of mode 2 (of field overheatingAssistanceENDC); or upon receiving fullConfig.

The UE switches to mode 2 upon receiving otherConfig indicating mode 2 (setup of field overheatingAssistanceENDC).

Option a) offers a slight advantage in that reverting back to mode 1 upon entering a legacy node does not require fullConfig i.e. involves complete reset.

Embodiments of the disclosure relate to the assistance provided by the UE to the network upon mode change. The legacy parameters are used in both modes. As mentioned before, the value of the UE preferences indicated by these legacy fields may depend on preferences indicated by the new fields for NR SCG. Hence, it is important to clarify what assistance UE shall provide upon mode change to ensure network has the correct understanding of UE status regarding overheating. This covers two aspects:

What contents shall UE include in UE assistance

When shall UE initiate sending of overheating assistance

Whenever the UE provides UE assistance, it shall signal all UE assistance parameters. For instance, upon moving to an MeNB supporting NR SCG overheating assistance, the UE shall include legacy overheating parameters even if the value would be same as it indicated before. This also means that network shall assume that for parameters that are not signalled anymore, any previously indicated value is to be cleared. Such operation can be illustrated by an example:

At T1 a UE connected to a legacy MeNB reports its preference for legacy parameter reducedMaxCCs At T2 the UE moved to an MeNB supporting NR SCG overheating assistance, and now only reports preferences for NR SCG i.e. maxBW for FR2. In this case, the network should clear the previously reported legacy parameter (i.e. because if the UE had wanted to keep it, it would have repeated it)

At T3, the UE merely reports a legacy parameter. In such a case, the network shall assume that the previously reported SCG overheating assistance is to be cleared. This may apply independent of whether at T3 the UE moves to an MeNB not supporting NR SCG overheating assistance The table below, TABLE 2, relates to assistance information provided by the UE to the network, upon mode change, together with the meaning of the information provided. The table clarifies what information the UE shall include whenever signalling UE overheating assistance.

TABLE 2

| Time | Overheating provided by UE | Meaning |
|---|---|---|
| T1 | UE indicates reducedMaxCCs set to value 2 | Network should configure at most 2 serving cells |
| T2' | UE indicates reducedMaxCCs set to value 2 and maximum aggregated BW for FR2 set to 200 MHz | Network should additionally ensure that total BW for FR2 is at most 200 MHz but can configure more than 2 serving cells |
| T3' | UE indicates reducedMaxCCs set to value 2 | Network should configure at most 2 serving cells, but no limitations apply regarding BW for FR2 |

In a second embodiment of the disclosure, various signalling protocols include lists such as list of cells, supported band combinations (with some parameters in each). When a new parameter is introduced, to be signalled for each entry in list, a parallel list may be created with the same number of entries listed in same order. This requires little overhead, but requires more lines in the specification and create problems in specifying such new parameters.

Occasionally, several lists appear for which the same information is to be signalled e.g. to extend list size or support more entries or to include entries not relevant for legacy nodes.

Examples are shown in FIGS. 3a and 3b which show two examples, the first for LTE and the second for New Radio (NR).

When more than one list is used for original fields, a single list is used for the new parameters. For this single list, the number of entries is equal to the total number of entries across the multiple lists for the original fields, and listed in a defined order.

Clarification is provided regarding the total size and the ordering as shown in the following example.

If network/UE includes xxListComb, the number of entries included corresponds to the total entries across in xxListYy and xxListYy2, and with entries corresponding to xxListYy2 placed after the entries corresponding to xxListYy and with entries in the first part in the same order as in xxListYy and, likewise, entries in second part listed in the same order as in xxListYy2.

Benefits of such an approach include helping to avoid errors i.e. due to forgetting extension for some of the multiple lists (as in NR BC example, FIG. 3b) and helping to reduce specification size (as shown for LTE example, FIG. 3a). Moreover, the signalling overhead is slightly reduced (i.e. as there is just a single length determinant for the list)

FIGS. 4a and 4b show alternative approaches to those shown in FIGS. 3a and 3b, for two different cases. In the first case, in FIG. 4a, the additional parameters that were added in v1310 are replaced by a single combined list (freqPriorityListCombEUTRA) that has a larger number of entries (i.e. 16 rather than 8 frequencies), as the list was extended (i.e. covering the original list size, first 8 entries, and its extension, the additional 8 entries).

If the network includes freqPriorityListCombEUTRA, the number of entries included corresponds to the total entries across in freqPriorityListEUTRA and freqPriorityListExtEUTRA, and with entries corresponding to freqPriorityListExtEUTRA placed after the entries corresponding to freqPriorityListEUTRA and with entries in the first part in the same order as in freqPriorityListEUTRA and, likewise, entries in second part listed in the same order as in freqPriorityListExtEUTRA.

In FIG. 4b, the original single lists can already support the extensions placed within NEDC-Only, when the total number of supported BCs did not increase merely due to introduction of NEDC. In this case the UE includes within supportedBandCombinationList-v15x0 two parts i.e. first the entries corresponding to supportedBandCombinationList (again listed in same order as in that field) and after that the entries corresponding to supportedBandCombinationListNEDC-Only (again listed in same order as in that field)

A further embodiment of the disclosure concerns the signalling aspects related to so called early measurements that the network may configure the UE to perform. These early measurements are performed while the UE is in an idle or an inactive mode. The latest results of these measurements are stored by the UE. If stored, the UE indicates availability of the measurement results when establishing or resuming a connection with the network. The network may subsequently request the UE to provide the results using the UE information procedure, which comprises a request and response message. Alternatively, the network may request the UE to provide the results during connection resumption, in which case the network blindly issues the request i.e. is not yet aware whether the UE has results available. In case the UE does not have results available, it simply ignores the blind request.

The early measurement reporting feature was introduced in Release 14 (R15) of the 3GPP LTE/EUTRA standards. R15 of the 3GPP standards introduced support for 5G or NR. Correspondingly, R15 of the LTE standards were extended to cover early measurement reporting for NR frequencies, primarily to assist the network to expedite configuration of dual connectivity with LTE (EUTRA) used for the master cell group (MCG) and NR for the secondary cell group (SCG) i.e. EN-DC.

The R14 early measurement procedures to involve signalling of:

SIM includes a field by which the network can basically indicate that it supports early measurements UE can indicate availability of results upon transition to connected i.e by a field in SetupComplete, ResumeComplete UEInformationRequest includes a field by which the network can request the UE to provide early measurement results UEInformationResponse includes a field by which the UE can provide early measurement results This embodiment relates to different ways to extend the signalling to support early measurement reporting for NR frequencies, given that there is a trade-off between flexibility and simplicity.

In a first option, that is the simplest, one additional field is introduced: i.e. an additional field in SIB2 indicating that the network supports early measurement reporting for NR frequencies. In this case, the procedure is as follows:

The UE uses the existing field to indicate availability of early measurement results, both for LTE and NR frequencies. i.e. the field will be used even if the UE only has results for NR frequencies The Network uses the existing field to request early measurement results. When receiving the request, the UE provides measurement result for LTE frequencies as in R14. In addition, the UE also includes results for NR frequencies it has available, but only if the new NR specific field in SIB2 indicates that the network supports this In a second option, a further additional field is introduced, specifically indicating availability of results for NR frequencies. In this case, there are more changes required to the standards specification and the procedure becomes as follows:

The UE uses the existing field to indicate availability of early measurement results for LTE frequencies. The UE uses the new field to indicate availability of results for NR frequencies The Network uses the existing field to request early measurement results. If the field is set, the UE provides measurement results in the same manner as in the first option, above.

In the second option, the network becomes aware whether the UE only has results for NR frequencies and can thus avoid initiating information retrieval when not interested in such results.

As mentioned previously, IDC is of interest and additional issues arise in NR, as its bands comprise a relatively large bandwidth and the network may configure the UE to operate in a particular portion of such frequency band.

Figure 5A:
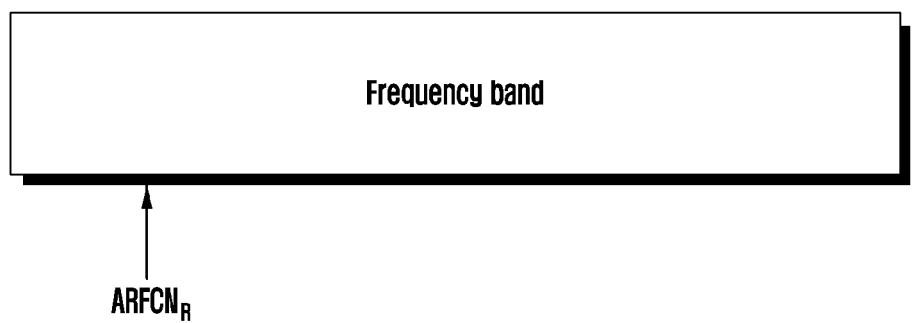
FIGS. 5*a*, 5*b*, and 5*c* shows frequency ranges for which the UE is to report IDC according to the prior art and according to an embodiment of the disclosure.
Figure 5B:
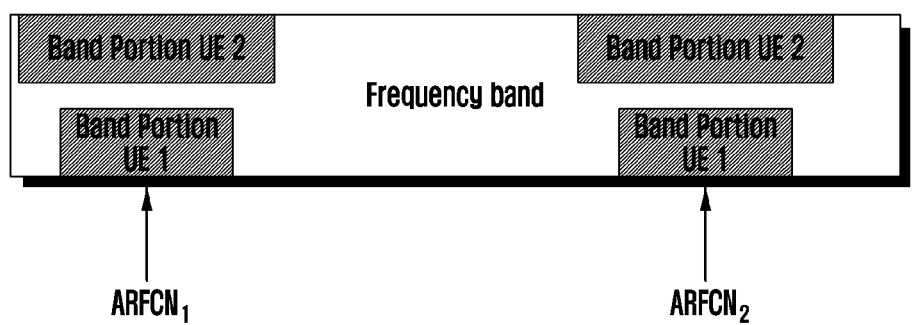
Figure 5C:
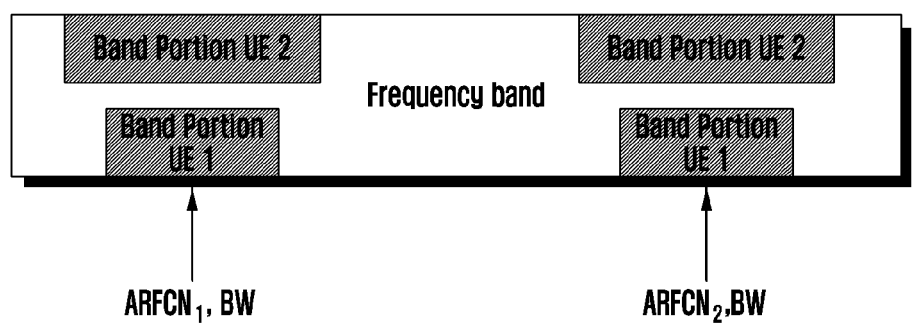

FIGS. 5a-5c show some of the issues involved, namely:

What the ARFCN (absolute radio frequency channel number) indicates precisely

The UE operation regarding the portion of the band for which to report IDC, depending on whether the network signals a bandwidth parameter or not In the prior art, as illustrated by FIG. 5a, the ARFCN signalled to the UE was interpreted to merely indicate the frequency band and the network could set it to some defined reference frequency within the band e.g. the centre of the band or the so-called pointA as defined in 3GPP standards. In such a case, the UE may have to provide an IDC indication whenever it detected IDC issues anywhere in the concerned frequency band even if the IDC issues related only to a limited portion of the band i.e. a limited frequency range. In this case, the network signals only a single ARFCN for a given frequency band.

In a first embodiment of this disclosure, ARFCN does not indicate the entire band but rather the specific centre frequency within the concerned frequency band around which UE is requested to report IDC. In this case, the UE provides an IDC indication when it detects IDC issues within a limited portion centred around the indicated ARFCN. In this case, the network does not signal the bandwidth to monitor, different UEs may monitor IDC issues for different bandwidth portions e.g. depending on their capabilities. This is illustrated by FIG. 5b which illustrates how two UEs (UE1 and UE2), given the same ARFCN will actually monitor different bandwidths according to their own configuration. FIG. 5b also illustrates that the network can actually signal multiple ARFCNs for a given frequency band, as shown by ARFCN1 and ARFCN2. In this way, the network can determine that although the UE experiences IDC issues around ARFCN1, it may have no IDC issues in the band portion centred around ARFCN2.

In a second embodiment of this disclosure, the network explicitly signals ARFCN, in addition to the bandwidth, BW, for which the UE shall report IDC issues. In this case, there is no doubt about the exact frequency range over which the UE is required to report IDC issues. Also, if the UE provides an IDC report, the network clearly knows which portion of the frequency band is affected by IDC problems and should therefore be avoided. i.e. this concerns the portion centred on ARFCN-2 and having the indicated bandwidth BW. This is illustrated by FIG. 5c, which also shows that the network may still request different UEs to report IDC around different ARFCNs and/or for different BW. Note that the band portion for UE2 is different for each ARFCN, indicating that UE2 is asked to monitor different bandwidths for each ARFCN.

In a further embodiment of this disclosure, in the case, above, where the BW is not indicated to the UE, then, the BW used for UE reporting is derived from the UE capabilities. If this is derived from UE capabilities according to some defined rule, the network would know which BW the UE employed when reporting IDC issues.

UE capabilities clarify what BW the UE can support for different possible configurations, in particular for different supported band combinations (BCs). One option is that the BW that UE uses for reporting IDC for a band can be the largest BW it supports for the concerned band across all supported band combinations including the concerned band as it indicated within the UE capabilities. As an example, if a band b1 is supported for 3 BCs (BC-a, BC-b, BC-c), with BW values respectively 10, 20 and 10 MHz. In such a case, the UE reports IDC if within a BW of 20 MHz, IDC issues are detected or expected.

If in the above example, the IDC issue is outside the centre 10 MHz, the UE will suffer from IDC problems only for BC-a and BC-c, but not for BC-b. The network may, however, have to refrain from configuring any of the three BCs, when unaware of the further details.

Another option would be that the UE applies the BW that the UE supports for the concerned band for all of the supported BCs including the concerned band. In the example above, this would be 10 MHz. Other options are however not excluded.

In case the UE is configured with a band combination including the band for which it is requested to report IDC issues, another option would be that UE applies the BW portion (or BWP) that the UE is actually configured to use. Alternatively, even if configured with a BC including the concerned band, the UE may still use for IDC reporting the BW according to a rule based on UE capabilities as described above. The alternative option may be more appropriate if the ARFCN indicated in the IDC configuration is outside the frequency range/BWP that UE is currently using.

The following concerns LTE IDC for an NR BW portion, and the signalling related thereto.

In a first case, the network indicates ARFCN for each BW portion to monitor. Prior art signalling may be sufficient. However, a larger number of ARFCNs may be needed so, for instance, four ARFCNs may be configured to a particular band. ASN.1 variants achieving the same or similar also apply.

FIG. 6 shows an example of a configuration which illustrates this first case.

In a second case, the network indicates ARFCN plus BW for each BW portion to monitor. The known prior art signalling requires an extension, at least to indicate BW.

As before, a larger number of ARFCNs may be needed so, for instance, four ARFCNs may be configured to a particular band. ASN.1 variants achieving the same or similar also apply.

FIG. 7 shows an example of a configuration which illustrates this second case.

Figure 8:
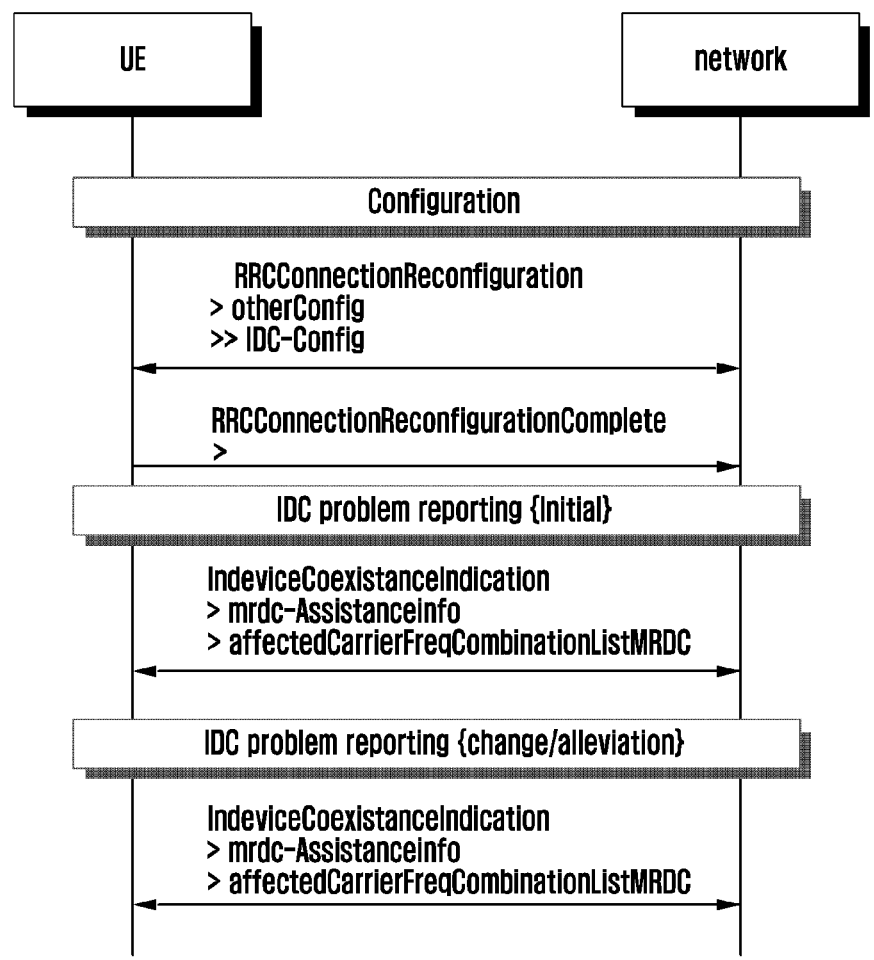
FIG. 8 shows a message exchange in connection with IDC reporting according to an embodiment of the disclosure.

FIG. 8 shows a representation of a message exchange between UE and network illustrating the setup of IDC configuration, initial reporting changed reporting.

Figure 9:
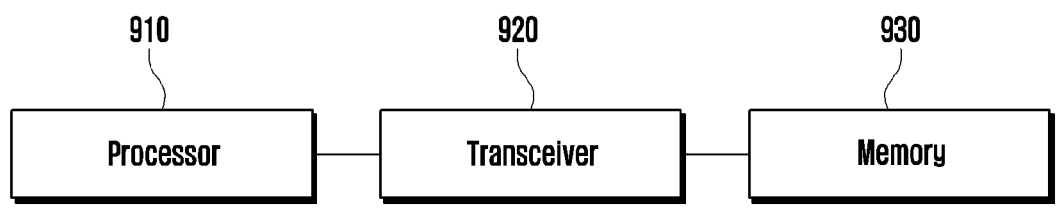
FIG. 9 is a block diagram of a user equipment (UE) in a wireless communication system according to an embodiment of the disclosure.

FIG. 9 is illustrates a block diagram of a user equipment (UE) in a wireless communication system according to an embodiment of the disclosure.

Referring to the FIG. 9, the UE 900 may include a processor 910, a transceiver 920 and a memory 930. However, all of the illustrated components are not essential. The UE 900 may be implemented by more or less components than those illustrated in FIG. 9. In addition, the processor 910 and the transceiver 920 and the memory 930 may be implemented as a single chip according to another embodiment.

The aforementioned components will now be described in detail.

The processor 910 may include one or more processors or other processing devices that control the proposed function, process, and/or method. Operation of the UE 900 may be implemented by the processor 910.

In one embodiment, the processor 910 may detect overheating (i.e. IDC issues) and control the transceiver 920 to transmit assistance information for the overheating to a base station.

In one embodiment, the processor 910 may monitor a BW portion associated with ARFCN and control the transceiver 920 to provide an IDC report associated with the ARFCN to a base station.

The transceiver 920 may include a RF transmitter for up-converting and amplifying a transmitted signal, and a RF receiver for down-converting a frequency of a received signal. However, according to another embodiment, the transceiver 920 may be implemented by more or less components than those illustrated in components.

The transceiver 920 may be connected to the processor 910 and transmit and/or receive a signal. The signal may include control information and data. In addition, the transceiver 920 may receive the signal through a wireless channel and output the signal to the processor 910. The transceiver 920 may transmit a signal output from the processor 910 through the wireless channel.

The memory 930 may store control information or data included in a signal obtained by the UE 900. The memory 930 may be connected to the processor 910 and store at least one instruction or a protocol or a parameter for the proposed function, process, and/or method. The memory 930 may include read-only memory (ROM) and/or random access memory (RAM) and/or hard disk and/or CD-ROM and/or DVD and/or other storage devices.

Figure 10:
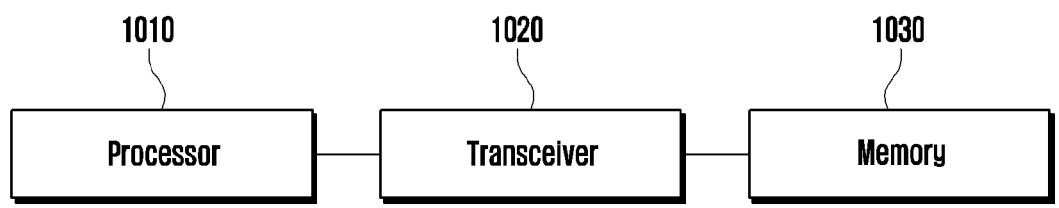
FIG. 10 is a block diagram of a base station in a wireless communication system according to an embodiment of the disclosure.

FIG. 10 is a block diagram of a base station in a wireless communication system according to an embodiment of the disclosure. In an embodiment of the disclosure, the base station includes a master node (MN) or a secondary node (SN). In an embodiment of the disclosure, the base station uses a radio access technology based on at least one of LTE or NR.

Referring to the FIG. 10, the base station 1000 may include a processor 1010, a transceiver 1020 and a memory 1030. However, all of the illustrated components are not essential. The base station 1000 may be implemented by more or less components than those illustrated in FIG. 10. In addition, the processor 1010 and the transceiver 1020 and the memory 1030 may be implemented as a single chip according to another embodiment.

The aforementioned components will now be described in detail.

The processor 1010 may include one or more processors or other processing devices that control the proposed function, process, and/or method. Operation of the base station 1000 may be implemented by the processor 1010.

In one embodiment, the processor 1010 may generate a configuration to include information indicating ARFCN associated with a BW portion.

In one embodiment, the processor 1010 may control the transceiver 1020 to transmit the configuration for assistance information of the overheating to the UE.

In one embodiment, the processor 1010 may control the transceiver 1020 to receive assistance information from the UE and control a radio configuration for the UE based on the assistance information.

The transceiver 1020 may include a RF transmitter for up-converting and amplifying a transmitted signal, and a RF receiver for down-converting a frequency of a received signal. However, according to another embodiment, the transceiver 1020 may be implemented by more or less components than those illustrated in components.

The transceiver 1020 may be connected to the processor 1010 and transmit and/or receive a signal. The signal may include control information and data. In addition, the transceiver 1020 may receive the signal through a wireless channel and output the signal to the processor 1010. The transceiver 1020 may transmit a signal output from the processor 1010 through the wireless channel.

The memory 1030 may store the control information or the data included in a signal obtained by the base station 1000. The memory 1030 may be connected to the processor 1010 and store at least one instruction or a protocol or a parameter for the proposed function, process, and/or method. The memory 1030 may include read-only memory (ROM) and/or random access memory (RAM) and/or hard disk and/or CD-ROM and/or DVD and/or other storage devices.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

In the above-described detailed embodiments of the disclosure, the elements included in the disclosure may be expressed in the singular or plural form depending on the proposed detailed embodiment. However, the singular or plural expression has been selected suitably for a situation proposed for convenience of description, and the disclosure is not limited to the singular or plural elements. Although an element has been expressed in the plural form, it may be configured in the singular form. Although an element has been expressed in the singular form, it may be configured in the plural form. The embodiments described in this specification have been individually described, but two or more of the embodiments may be combined and practiced.

Although the detailed embodiments have been described in the detailed description of the disclosure, the disclosure may be modified in various ways without departing from the scope of the disclosure. Accordingly, the scope of the disclosure should not be limited to the above-described embodiments, but should be defined by not only the claims, but equivalents thereof.

The embodiments of the disclosure and the terms used in the embodiments are not intended to limit the technology described in this document to a specific embodiment, but should be construed as including various changes, equivalents and/or alternatives of a corresponding embodiment. Regarding the description of the drawings, similar reference numerals may be used in similar elements. An expression of the singular number may include an expression of the plural number unless clearly defined otherwise in the context. In this document, an expression, such as "A or B", "at least one of A or/and B", "A, B or C" or "at least one of A, B and/or C", may include all of possible combinations of listed items together. Expressions, such as "a first," "a second," "the first" and "the second", may modify corresponding elements regardless of the sequence and/or importance, and are used to only distinguish one element from the other element and do not limit corresponding elements. When it is described that one (e.g., first) element is "(operatively or communicatively) connected to" or "coupled with" the other (e.g., second) element, one element may be directly connected to the other element or may be connected to the other element through another element (e.g., third element).

The "module" used in the disclosure includes a unit configured with hardware, software or firmware, and may be interchangeably used with a term, such as logic, a logical block, a part or a circuit. The module may be an integrated part, a minimum unit to perform one or more functions, or a part thereof. For example, the module may be configured with an application-specific integrated circuit (ASIC).

The various embodiments of the disclosure may be implemented as machine (e.g., computer)-readable storage media (e.g., software (e.g., program) including instructions stored in an internal memory or external memory). A device is an apparatus capable of fetching instructions stored in the storage media and operating according to the fetched instructions, and may include a base station or UE according to various embodiments. If the instruction is executed by the processor (e.g., the processor 910 of FIG. 9 or the processor 1020 of FIG. 10), a function corresponding to the instruction may be directly performed by the processor or may be performed using other elements under the control of the processor. The instruction may include code generated or executed by a compiler or interpreter.

The machine-readable storage media may be provided in the form of a non-transitory storage medium. In this case, the term "non-transitory" means that the storage media do not include a signal and is tangible, and is not limited to whether data is stored in the storage media semi-permanently or temporally.

The method according to various embodiments disclosed in the disclosure may be included in a computer program product and provided. The computer program product may be traded as a product between a seller and a purchaser. The computer program product may be online distributed in the form of device-readable storage media (e.g., compact disc read only memory (CD-ROM)) or through an app store (e.g., PlayStore). In the case of the online distribution, at least some of the computer program product may be at least temporarily stored or temporally generated in storage media, such as the memory of the server of a manufacturer, the server of an app store or a relay server.

Each of elements (e.g., module or program) according to various embodiments may be configured with a single entity or a plurality of entities. Some of the above-described sub-elements may be omitted other sub-elements may be further included in various embodiments. Alternatively or additionally, some elements (e.g., modules or programs) may be integrated into one entity, and may perform a function, performed by each corresponding element prior to the integration, identically or similarly.

Operations performed by a module, a program or other elements according to various embodiments may be executed sequentially, in parallel, repeatedly, or heuristically, or at least some operations may be executed in different order or may be omitted, or other operations may be added.

The methods of the embodiments illustrated in FIGS. 1 to 10 can include a combination of methods from more than one illustration.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method performed by a base station in a wireless communication system, the method comprising:
transmitting, to a terminal, configuration information on an in device coexistence (IDC) assistance operation including information on a list of at least one candidate serving frequency range, wherein information on each candidate serving frequency range includes first information indicating a first center frequency of a corresponding candidate frequency range and second information indicating a bandwidth corresponding to the first center frequency, and the first information includes a value of an absolute radio frequency channel number (ARFCN) for which the terminal is requested to report an IDC problem; and
receiving, from the terminal, IDC assistance information including information on an affected carrier frequency associated with the IDC problem based on the configuration information, the information on the affected carrier frequency including third information indicating a second center frequency of the affected carrier frequency and fourth information indicating a bandwidth corresponding to the second center frequency, wherein the second center frequency of the affected carrier frequency is located within the bandwidth corresponding to the first center frequency.

2. The method of claim 1, wherein, in case that a plurality of frequency bands are configured for the terminal and the candidate serving frequency range is included in band combinations supported by the terminal, the information on the affected carrier frequency includes information indicating at least one band combination affected by the IDC problem.

3. A method performed by a terminal in a wireless communication system, the method comprising:
receiving, from a base station, configuration information on an in device coexistence (IDC) assistance operation including information on a list of at least one candidate serving frequency range, wherein information on each candidate serving frequency range includes first information indicating a first center frequency of a corresponding candidate frequency range and second information indicating a bandwidth corresponding to the first center frequency, and the first information includes a value of an absolute radio frequency channel number (ARFCN) for which the terminal is requested to report an IDC problem;
identifying, based on the configuration information, an affected carrier frequency for which the terminal detects the IDC problem, wherein a second center frequency of the affected carrier frequency is located within the bandwidth corresponding to the first center frequency; and
transmitting, to the base station, IDC assistance information including information on the affected carrier frequency,
wherein the information on the affected carrier frequency includes third information indicating the second center frequency of the affected carrier frequency and fourth information indicating a bandwidth corresponding to the second center frequency.

4. The method of claim 3, wherein, in case that a plurality of frequency bands are configured for the terminal and the candidate serving frequency range is included in band combinations supported by the terminal, the information on the affected carrier frequency includes information indicating at least one band combination affected by the IDC problem.

5. A base station in a wireless communication system, the base station comprising:
a transceiver; and
a controller configured to:
control the transceiver to transmit, to a terminal, configuration information on an in device coexistence (IDC) assistance operation including information on a list of at least one candidate serving frequency range, wherein information on each candidate serving frequency range includes first information indicating a first center frequency of a corresponding candidate frequency range and second information indicating a bandwidth corresponding to the first center frequency, and the first information includes a value of an absolute radio frequency channel number (ARFCN) for which the terminal is requested to report an IDC problem, and
control the transceiver to receive, from the terminal, IDC assistance information including information on an affected carrier frequency associated with the IDC problem based on the configuration information, the information on the affected carrier frequency including third information indicating a second center frequency of the affected carrier frequency and fourth information indicating a bandwidth corresponding to the second center frequency,
wherein the second center frequency of the affected carrier frequency is located within the bandwidth corresponding to the first center frequency.

6. The base station of claim 5, wherein, in case that a plurality of frequency bands are configured for the terminal and the candidate serving frequency range is included in band combinations supported by the terminal, the information on the affected carrier frequency includes information indicating at least one band combination affected by the IDC problem.

7. A terminal in a wireless communication system, the terminal comprising:
a transceiver; and
a controller configured to:
control the transceiver to receive, from a base station, configuration information on an in device coexistence (IDC) assistance operation including information on a list of at least one candidate serving frequency range, wherein information on each candidate serving frequency range includes first information indicating a first center frequency of a corresponding candidate frequency range and second information indicating a bandwidth corresponding to the first center frequency, and the first information includes a value of an absolute radio frequency channel number (ARFCN) for which the terminal is requested to report an IDC problem,
identify, based on the configuration information, an affected carrier frequency for which the terminal detects the IDC problem, wherein a second center frequency of the affected carrier frequency is located within the bandwidth corresponding to the first center frequency, and
control the transceiver to transmit, to the base station, IDC assistance information including information on the affected carrier frequency,
wherein the information on the affected carrier frequency includes third information indicating the second center frequency of the affected carrier frequency and fourth information indicating a bandwidth corresponding to the second center frequency.

8. The terminal of claim 7, wherein, in case that a plurality of frequency bands are configured for the terminal and the candidate serving frequency range is included in band combinations supported by the terminal, the information on the affected carrier frequency includes information indicating at least one band combination affected by the IDC problem.

* * * * *

UNITED STATES PATENT AND TRADEMARK OFFICE
CERTIFICATE OF CORRECTION

PATENT NO. : 12,309,618 B2
APPLICATION NO. : 17/757209
DATED : May 20, 2025
INVENTOR(S) : Himke Van Der Velde et al.

Page 1 of 1

It is certified that error appears in the above-identified patent and that said Letters Patent is hereby corrected as shown below:

In the Claims

Column 19, Claim 1, Line 2, delete "within the bandwidth" and insert --within a band--
Column 19, Claim 3, Line 29, delete "within the bandwidth" and insert --within a band--
Column 20, Claim 5, Line 13, delete "within the bandwidth" and insert --within a band--
Column 20, Claim 7, Line 43, delete "within the bandwidth" and insert --within a band--

Signed and Sealed this
Fifteenth Day of July, 2025

Coke Morgan Stewart
*Acting Director of the United States Patent and Trademark Office*